Figure 1:
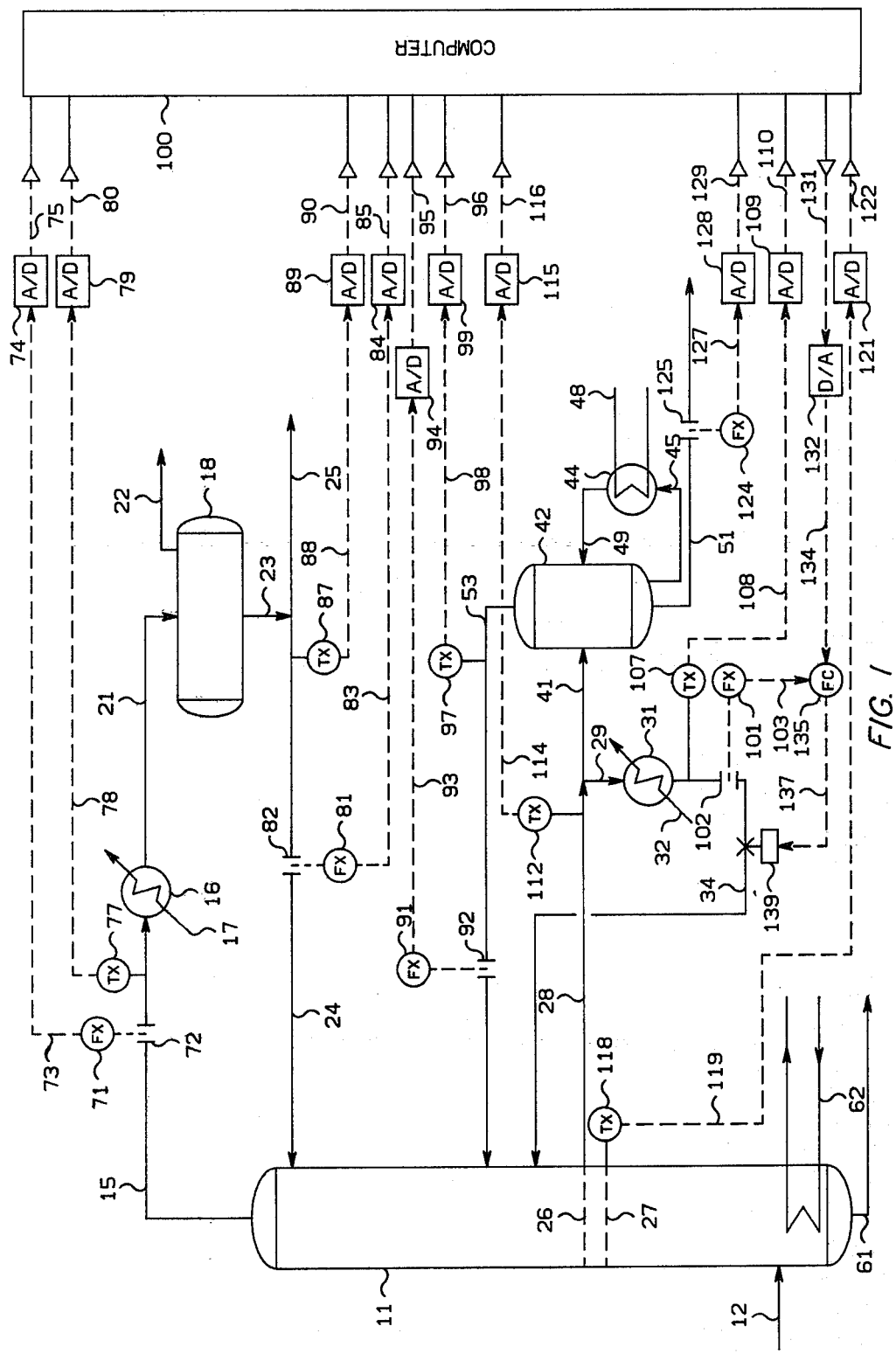

United States Patent [19]

Furr

[11] 4,319,330

[45] Mar. 9, 1982

[54] FRACTIONAL DISTILLATION COLUMN CONTROL

[75] Inventor: Danny L. Furr, Broken Arrow, Okla.

[73] Assignee: Phillips Petroleum Co., Bartlesville, Okla.

[21] Appl. No.: 145,640

[22] Filed: May 1, 1980

[51] Int. Cl.³ .............................................. B01D 3/42
[52] U.S. Cl. ...................................... 364/501; 62/37; 196/132; 202/160
[58] Field of Search ................. 208/DIG. 1; 203/1, 2, 203/3, DIG. 18; 196/132; 62/21, 37; 202/160, 206; 364/501

[56] References Cited

U.S. PATENT DOCUMENTS 3,463,725 8/1969 MacFarlane et al. .............. 208/358
4,096,574 6/1978 Christie ............................ 364/501

Primary Examiner—Frank Sever

[57] ABSTRACT

In a fractional distillation column, a desired ratio between the flow rate of a side draw product stream and the internal reflux flow rate at the particular tray from which a side draw stream is withdrawn from the fractional distillation column is maintained by manipulating the flow rate of the center reflux stream so as to maintain the desired ratio between the internal reflux flow rate and a side draw product stream flow rate at the particular tray from which the side draw stream is withdrawn from the fractional distillation column. Control of the ratio between the flow rate of a side draw product stream and the internal reflux flow rate results in an improved side draw product stream purity.

8 Claims, 2 Drawing Figures

FRACTIONAL DISTILLATION COLUMN CONTROL

This invention relates to fractional distillation. In one aspect this invention relates to method and apparatus for maintaining a desired side draw product stream purity for a fractional distillation process.

Heat is commonly added to a fractional distallation column through a fired reboiler heater or by circulating a heated fluid through the lower portion of the fractional distillation column. Heat is commonly removed from the fractional distillation column by overhead condensers. In some fractional distillation columns, closer control of the heat removal from the fractional distillation column is accomplished by using a combination of overhead condensers and a pumparound stream which is withdrawn from the side of the fractional distillation column, circulated through a cooler, and returned as a center reflux to the fractional distillation column.

The amount of heat removed from the fractional distillation column directly determines the internal reflux flow rate. The internal reflux flow rate must be maintained at desired levels to obtain products which meet predetermined specifications. It is thus necessary to closely control the heat removal from the fractional distillation column if desired product specifications are to be obtained.

It is thus an object of this invention to provide method and apparatus for maintaining a desired side-draw product stream purity for a fractional distillation process.

In accordance with the present invention, method and apparatus is provided whereby the flow rate of the center reflux to a fractional distillation column is manipulated to maintain a desired side draw product stream purity. A side draw stream is withdrawn from the fractional distillation column, cooled, and returned to the fractional distillation column as the center reflux. The remaining portion of the side draw stream is provided to a separator. Liquid is removed from the separator as a side draw product stream. The required flow rate of the center reflux can be derived from the calculated required heat which must be supplied by the center reflux.

Figure 2:
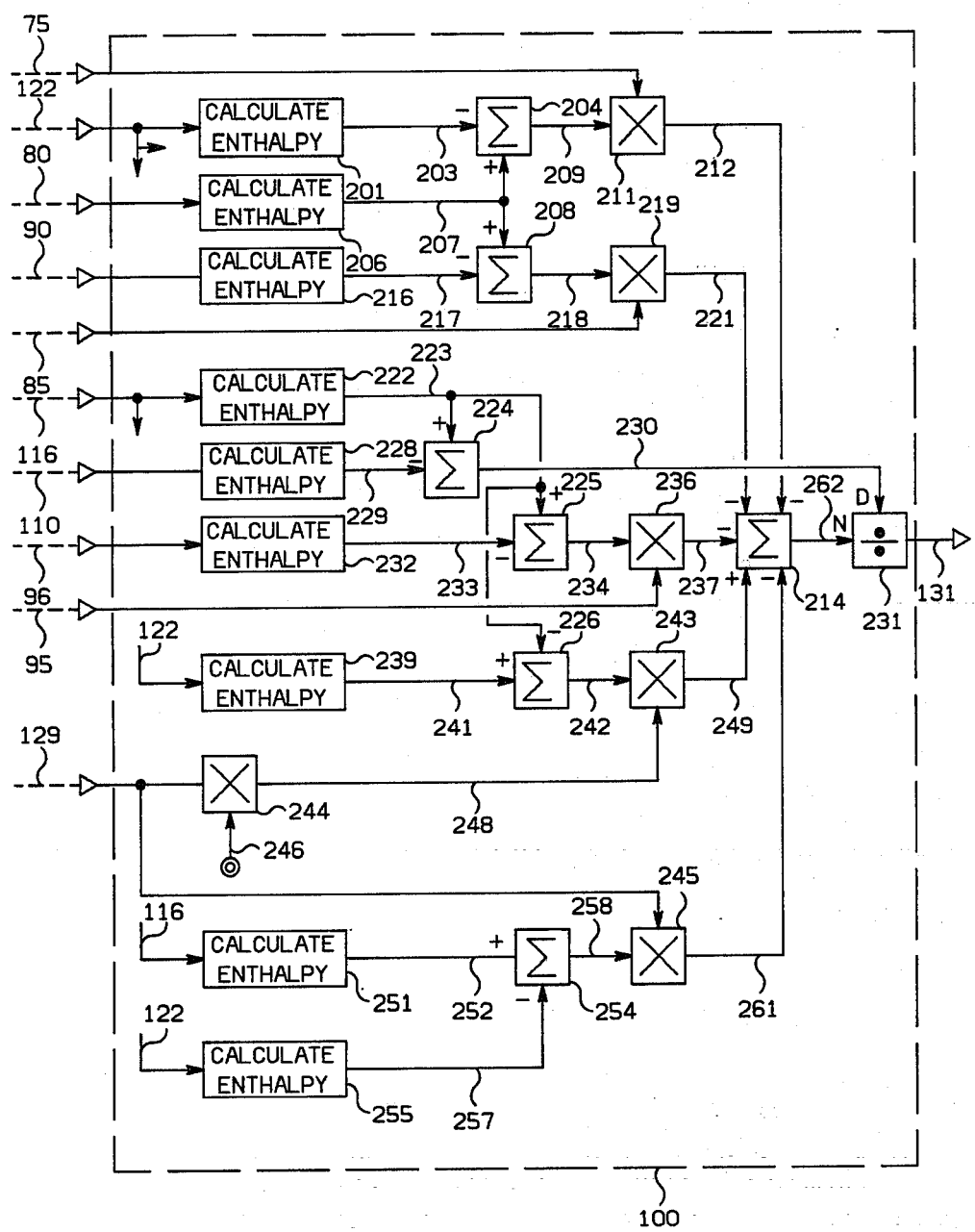

Other objects and advantages of the invention will be apparent from the foregoing brief description of the invention and the claims as well as from the detailed description of the drawings in which:

FIG. 1 is an illustration of a fractional distillation column and the associated control system for maintaining a desired ratio between the side draw product stream flow rate and the internal reflux flow rate at the particular tray with which the product stream is associated; and FIG. 2 is a flow diagram of the computer logic required to generate the control signals utilized to control the flow rate of the center reflux for the fractional distillation column illustrated in FIG. 1.

The invention is illustrated and described in terms of a crude oil distillation column in which crude oil is fractionated. However, the invention is applicable to any fractional distillation column in which a center reflux is provided to the distillation column and a product is withdrawn from a central portion of the fractional distillation column.

Although the invention is illustrated and described in terms of a specific fractionation column and a specific control system for the fractionation column, the invention is also applicable to different types and configurations of fractionation columns as well as different types of control system configurations which accomplish the purpose of the invention. Lines designated as signal lines in the drawings are electrical in this preferred embodiment. However, the invention is also applicable to pneumatic, mechanical, hydraulic or other signal means for transmitting information. In almost all control systems some combination of these types of signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention. The preferred computer is the OPTROL ® 7000 process computer system from Applied Automation, Inc., Bartlesville, Okla.

The controller shown may utilize the various modes of control such as proportional, proportional-integral, proportional-derivative, or proportional-integral-derivative. In this preferred embodiment, proportional-integral controllers are utilized but any controller capable of accepting two input signals and producing a scaled output signal, representative of a comparison of the two input signals, is with the scope of the invention. The operation of proportional-integral controllers is well known in the art. The output control signal of a proportional-integral controller may be represented as $$S = K_1 E + K_2 \int E\,dt$$

where $S$ = output control signals;
$E$ = difference between two input signals; and
$K_1$ and $K_2$ = constants.

The scaling of an output signal by a controller is well known in control systems art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual pressures equal. On the other hand, the same output signal could be scaled to represent a percentage or could be scaled to represent a temperature change required to make the desired and actual pressures equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a vareity of forms or formats. For example, the control elements of the system can be implemented using electrical analog, digital electronic, pneumatic, hydraulic, mechanical or other similar types of equipment or combinations of one or more of such equipment types. While the presently preferred embodiment of the invention preferably utilizes a combination of electrical final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an equipment failure from being erroneously interpreted as a "low" or "high" measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings, and in particular to FIG. 1, there is illustrated a fractional distillation column 11 which is utilized to fractionate a crude oil feed into a variety of products. For the sake of simplicity, only the overhead product, bottoms product and one side product are illustrated in FIG. 1. The crude oil feed is supplied to the fractional distillation column 11 through conduit means 12.

An overhead stream is provided from the fractional distillation column 11 through conduit means 15 to the het exchanger 16. The heat exchanger 16 is provided with a cooling medium flowing through conduit means 17. The partially condensed fluid stream from the heat exchanger 16 is provided to the overhead accumulator 18 through conduit means 21. The portion of the fluid stream flowing through conduit means 21 which remains in vapor form is withdrawn from the overhead accumulator 18 through conduit means 22 as a fuel gas. The liquid portion of the fluid stream flowing through conduit means 21 is withdrawn from the accumulator 18 through conduit means 23. The fluid flowing through conduit means 23 is provided as an upper external reflux to the fractional distillation column 11 through the combination of conduit means 23 and conduit means 24. The fluid flowing through conduit means 23 is also provided as the light naphtha product from the fractional distillation column 11 by the combination of conduit means 23 and 25.

The fractional distillation column 11 contains a plurality of trays of which only trays 26 and 27 are illustrated. A heavy naphtha side draw stream is withdrawn from the fractional distillation column 11 from the area of tray 26 through conduit means 28. A portion of the heavy naphtha side draw stream flowing through conduit means 28 is provided through conduit means 29 to the heat exchanger 31. The heat exchanger 31 is provided with a cooling fluid through conduit means 32. The fluid flowing through conduit means 29 is provided from the heat exchanger 31 through conduit means 34 as a center reflux to the fractional distillation column 11. The center reflux is returned above tray 26. Heat is withdrawn from the fractional distillation column 11 by withdrawing the heavy naphtha side draw stream, cooling a portion of the heavy naphtha side draw stream and returning the thus cooled portion of the heavy naphtha side draw stream to the fractional distillation column 11.

The remaining portion of the heavy naphtha side draw stream flowing through conduit means 28 is provided through conduit means 41 to the separator 42. Liquid is withdrawn from the separator 42 and is provided to the heat exchanger 44 through conduit means 45. A heating fluid is provided to the heat exchanger 44 through conduit means 48. The thus heated fluid is provided from the heat exchanger 44 through conduit means 49 to separator 42. A second liquid stream is withdrawn from the separator 42 through conduit means 51 as a heavy naphtha side draw product stream. The vapor portion of the fluid in separator 42 is returned to the fractional distillation column 11 through conduit means 53. The vapor stream flowing through conduit means 53 is also returned to the fractional distillation column 11 at a point above the tray 26.

A bottom stream generally containing reduced crude is withdrawn from the fractional distillation column 11 through conduit means 61. Heat is supplied to the fractional distillation column 11 by a heating fluid flowing through conduit means 62.

A number of other streams would generally be withdrawn from or provided to a fractional distillation column which is utilized to separate crude oil into various components. For the sake of simplicity, these streams have not been illustrated in FIG. 1. Also, the many pumps, additional heat exchangers, additional control components and other typical fractional distillation column equipment have not been illustrated for the sake of simplicity.

Flow transducer 71 in combination with the flow sensor 72, which is operably located in conduit means 15, provides an output signal 73 which is representative of the flow rate of the fluid flowing through conduit means 15. Signal 73 is provided from the flow transducer 71 as an input to the analog-to-digital converter 74. Signal 73 is converted from analog form to digital form and is provided as signal 75 to computer means 100.

Temperature transducer 77 in combination with a temperature measuring device such as a thermocouple, which is operably located in conduit means 15, provides an output signal 78 which is representative of the temperature of the fluid flowing through conduit means 15. Signal 78 is provided from the temperature transducer 77 as an input to the A/D converter 79. Signal 78 is converted from analog form to digital form and is provided as signal 80 to computer means 100.

Flow transducer 81 in combinations with the flow sensor 82, which is operably located in conduit means 24, provides an output signal 83 which is representative of the flow rate of the fluid flowing through conduit means 24. Signal 83 is provided from the flow transducer 81 as an input to the A/D converter 84. Signal 83 is converted from analog form to digital form and is provided as signal 85 to computer means 100.

Temperature transducer 87 in combination with a temperature measuring device such as a thermocouple, which is operably located in conduit means 24, provides an output signal 88 which is representative of the temperature of the fluid flowing through conduit means 24. Signal 88 is provided from the temperature transducer 87 as an input to the A/D converter 89. Signal 88 is converted from analog form to digital form and is provided as signal 90 to computer means 100.

Flow transducer 91 in combination with the flow sensor 92, which is operably located in conduit means 53, provides an output signal 93 which is representative of the flow rate of the fluid flowing through conduit means 53. Signal 93 is provided from the flow transducer 91 as an input to the A/D converter 94. Signal 93 is converted from analog form to digital form and is provided as signal 95 to computer means 100.

Temperature transducer 97 in combination with a temperature measuring device such as a thermocouple, which is operably located in conduit means 53, provides an output signal 98 which is representative of the temperature of the fluid flowing through conduit means 53. Signal 98 is provided from the temperature transducer 97 as an input to the A/D converter 99. Signal 98 is converted from analog form to digital form and is provided as signal 96 to computer means 100.

Temperature transducer 107 in combination with a temperature measuring device such as a thermocouple, which is operably located in conduit means 34, provides an output signal 108 which is representative of the temperature of the fluid flowing through conduit means 34. Signal 108 is provided from the temperature transducer 107 as an input to the A/D converter 109. Signal 108 is converted from analog form to digital form and is provided as signal 110 to computer means 100.

Temperature transducer 112 in combination with a temperature measuring device such as a thermocouple, which is operably located in conduit means 28, provides an output signal 114 which is representative of the temperature of the fluid flowing through conduit means 28. Signal 114 is provided from the temperature transducer 112 as an input to the A/D converter 115. Signal 114 is converted from analog form to digital form and is provided as signal 116 to computer means 100.

Temperature transducer 118 in combination with a temperature measuring device such as a thermocouple, which is operably located in the fractional distillation column 11 in the approximate area of tray 27, provides an output signal 119 which is representative of the temperature in the fractional distillation column 11 at tray 27. Signal 119 is provided from the temperature transducer 118 as an input to the A/D converter 121. Signal 119 is converted from analog form to digital form and is provided as signal 122 to computer means 100.

Flow transducer 124 in combination with flow sensor 125, which is operably located in conduit means 51, provides an output signal 127 which is representative of the flow rate of the fluid flowing through conduit means 51. Signal 127 is provided from the flow transducer 124 as an input to the A/D converter 128. Signal 127 is converted to analog form to digital form and is provided as signal 129 to computer means 100.

In response to the described input signals, computer means 100 calculates the flow rate of the center reflux flowing through conduit means 34 which is required to maintain a desired ratio between the flow rate of the internal reflux at tray 27 and the flow rate of the heavy naphtha side draw product stream flowing through conduit means 51. Signal 131, which is representative of this required flow rate, is provided from computer means 100 as an input to the digital to analog (D/A) converter 132. Signal 131 is converted from digital form to analog form and is provided as signal 134 to the flow controller 135. Signal 134 is the set point for the flow controller 135.

Flow transducer 101 in combination with the flow sensor 102, which is operably located in conduit means 34, provides an output signal 103 which is representative of the flow rate of the fluid flowing through conduit means 34. Signal 103 is provided from the flow transducer 101 as an input to the flow controller 135.

The flow controller 135 provides an output signal 137 which is responsive to the difference between signals 103 and 134. Signal 137 is provided to the motor actuated control valve 139 which is operably located in conduit means 34. The motor actuated control valve 139 is manipulated in response to signal 137 to thereby maintain the actual flow rate of the pumparound stream flowing through conduit means 34 substantially equal to the desired flow rate of the pumparound stream flowing through conduit means 34.

The following development of the control signal 131, illustrated in FIG. 1, is provided to clarify the logic flow diagram illustrated in FIG. 2. The internal reflux flow rate in the fractional distillation column 11 at tray 26 may be determined from a heat balance around tray 26 and the upper portion of the fractional distillation column 11. For the fractional distillation column 11 illustrated in FIG. 1, the internal reflux flow rate at tray 26 is given by:

$$RI_{26} = [(F_{15})(DHV) + (F_{24})(DHR) + (F_{34})(DHHNPA) + (F_{51})(DHHVNA) + (F_{53})(DHPADS]/DHINT \quad (I)$$

where $F_{15}$=flow rate of the overhead stream flowing through conduit means 15;

$F_{24}$=flow rate of the upper external reflux flowing through conduit means 24;

$F_{34}$=flow rate of the center reflux stream flowing through conduit means 34;

$F_{51}$=flow rate of the side draw product stream flowing through conduit means 51;

$F_{53}$=flow rate of the center vapor external reflux flowing through conduit means 53; and DHV, DHR, DHHNPA, DHHVNA, DHPADS and DHINT all represent enthalpy changes.

DHV is given by:

$$DHV = HV_{15} - HV_{27} \quad (II)$$

where $HV_{15}$=enthalpy of the overhead stream flowing through conduit means 15; and $HV_{27}$=enthalpy of the vapor at tray 27;

DHR is given by:

$$DHR = HV_{15} - HL_{24} \quad (III)$$

where $HL_{24}$=enthalpy of upper external reflux flowing through conduit means 24; and $HV_{15}$ is as previously defined.

DHHNPA is given by:

$$DHHNPA = HL_{28} - HL_{34} \qquad (IV)$$

where $HL_{28}$ = enthalpy of the side draw stream flowing through conduit means 28; and $HL_{34}$ = enthalpy of the center reflux stream flowing through conduit means 34;

DHHVNA is given by:

$$DHHVNA = HHNL_{26} - HHNV_{27} \qquad (V)$$

where $HHNL_{26}$ = enthalpy of the heavy naphtha liquid on tray 26; and $HHNV_{27}$ = enthalpy of the heavy naphtha vapor on tray 27.

DHPADS is given by:

$$DHPADS = (HL_{28} - HV_{53}) \qquad (VI)$$

where $HV_{53}$ = enthalpy of the center vapor reflux flowing through conduit means 53; and $HL_{28}$ is as previously defined.

DHINT is given by:

$$DHINT = HHNV_{27} - HL_{28} \qquad (VII)$$

where $HHNV_{27}$ and $HL_{28}$ are as previously defined.

The flow rate of the internal reflux ($RI_{26}$) cannot be measured, but in the present case, the flow rate of the internal reflux is established by the desired ratio between the flow rate of the side draw product stream flowing through conduit means 51 and the flow rate of the internal reflux at tray 26. Since the flow rate of the internal reflux at tray 26 will be set by the desired ratio, equation (I) can be solved to give the flow rate of the center reflux stream flowing through conduit means 34 which is required to maintain the desired ratio between the flow rate of the side draw product stream flowing through conduit means 51 and the flow rate of the internal reflux at tray 26. Rearranging equation (I) to solve for a calculated value of the flow rate of the pumparound return stream flowing through conduit means 34 ($FC_{34}$) required to maintain the desired ratio between the flow rate of the side draw product stream flowing through conduit means 51 and the internal reflux flow rate at tray 26 gives $$F_{34} = [(RI_{26})(DHINT) - (F_{15})(DHV) \\ - (F_{24})(DHR) - (F_{51})(DHHVNA) \\ - (F_{53})(DHPADS)]/DHHNPA \qquad (VIII)$$

The logic flow diagram utilized to calculate the control signal 131 in response to the previously described input signals to the computer means 100 is illustrated in FIG. 2. Symbols described and defined in equations (I)-(VII) are utilized in the description of FIG. 2. Referring now to FIG. 2, computer means 100 is shown as a dotted line surrounding the flow logic. Signal 122, which is representative of the temperature at tray 27, is provided as an input to the calculate enthalpy block 201 and is also provided as an input to the calculate enthalpy blocks 239 and 255. Signal 203, which is representative of the enthalpy of the vapor at tray 27 ($HV_{27}$), is provided from the calculate enthalpy block 201 to the subtrahend input of the summing block 204.

A plurality of methods are available for calculating enthalpy based on the temperature of a specific stream. The most common method is to utilize the specific gravity of the stream and the temperature of a stream to directly derive the enthalpy from a set of standard curves. A set of standard curves which may be utilized is the "Heat Content of Petroleum Fractions" curves illustrated at FIG. 5-3 of *Petroleum Refinery Engineering* by W. L. Nelson, Fourth Edition, McGraw-Hill, 1958. Correction factors for pressure and UOPK are also available from these curves. In the present invention, the temperature of a specific stream or portion of a stream is utilized to calculate the enthalpy in Btu's per barrel. In each case, the specific gravity utilized to calculate the enthalpy relates directly to the particular stream or portion of a stream which is referred to in the definitions given in equations (II)-(VII).

Signal 80, which is representative of the temperature of the overhead stream flowing through conduit means 15, is provided as an input to the calculate enthalpy block 206. Signal 207, which is representative of the enthalpy of the overhead stream flowing through conduit means 15 ($HV_{15}$), is provided to the minuend input of the summing block 204 and the summing block 208. Signal 203 is subtracted from signal 207 in summing block 204 to provide signal 209, which is representative of DHV. Signal 209 is provided from the summing block 204 to the multiplying block 211.

The summing block 204 is illustrated as a summing block even though signal 203 is subtracted from signal 207. This is a standard procedure in computer logic diagrams and does not indicate an actual summation in block 204. The operation in the summing block 204 is given by the symbols plus and minus at the inputs to the summing block 204.

Signal 75, which is representative of the flow rate of the fluid flowing through conduit means 15 ($F_{15}$), is provided as an input to the multiplying block 211. Signal 209 is multiplied by signal 75 to produce signl 212 which is representative of $F_{15}$ (DHV). Signal 212 is provided to a subtrahend input of the summing block 214.

Signal 90, which is representative of the temperature of the overhead reflux flowing through conduit means 24, is provided as an input to the calculate enthalpy block 216. Signal 217, which is representative of the enthalpy of the overhead reflux flowing through conduit means 24 ($HL_{24}$), is provided to the subtrahend input of the summing block 208. Signal 217 is subtracted from 207 to provide signal 218, which is representative of DHR. Signal 218 is provided from the summing block 208 as an input to the multiplying block 219. The multiplying block 219 is also provided with signal 85, which is representative of the flow rate of the overhead reflux flowing through conduit means 24 ($F_{24}$). Signal 218 is multiplied by signal 85 to produce signal 221 which is representative of $F_{24}$ (DHR). Signal 221 is provided to a second subtrahend input of the summing block 214.

Signal 116, which is representative of the temperature of the pumparound draw flowing through conduit means 28, is provided as an input to the calculate enthalpy block 222 and is also provided as an input to the calculate enthalpy block 251. Signal 223, which is representative of the enthalpy of the side draw stream flowing through conduit means 28, is provided from the calculate enthalpy block 222 to the minuend input of the summing block 224, the minuend input of the summing block 225 and the subtrahend input of the summing block 226. Signal 110, which is representative of the temperature of the center reflux stream flowing through conduit means 34, is provided as an input to the calculate enthalpy block 228. Signal 229, which is representative of the enthalpy of the center reflux stream flowing through conduit means 34 ($HL_{34}$), is provided to the subtrahend input of the summing block 224. Signal 229 is subtracted from signal 223 to provide signal 230, which is represenative of DHHNPA. Signal 230 is provided to the denominator input of the dividing block 231.

Signal 96, which is representative of the temperature of the vapor stream flowing through conduit means 53, is provided as an input to the calculate enthalpy block 232. Signal 233, which is representative of the enthalpy of the vapor stream flowing through conduit means 53 ($HV_{53}$), is provided to the subtrahend input of the summing block 225. Signal 233 is subtracted from signal 223 to provide signal 234, which is representative of DHPADS. Signal 234 is provided from the summing block 225 as an input to the multiplying block 236. The multiplying block 236 is also provided with signal 95, which is representative of the flow rate of the fluid flowing through conduit means 53 ($F_{53}$). Signal 234 is multiplied by signal 95 to establish signal 237, which is representative of $F_{53}$ (DHPADS). Signal 237 is provided from the multiplying block 236 to a third subtrahend input of the summing block 214.

As has been previously stated, signal 122, which is representative of the temperature at tray 27, is provided as an input to the calculate enthalpy block 239. Signal 241, which is representative of the enthalpy of the heavy naphtha vapor at tray 27 ($HHNV_{27}$) is provided from the calculate enthalpy block 239 to the minuend input of the summing block 226. Signal 223 is subtracted from signal 241 to establish signal 242, which is representative of DHINT. Signal 242 is provided from the summing block 226 as an input to the multiplying block 243.

Signal 129, which is representative of the flow rate of the side draw product stream flowing through conduit means 51, is provided as an input to the multiplying block 244 and as an input to the multiplying block 245. The multiplying block 244 is also provided with a set point signal 246, which is representative of the desired ratio between the flow rate of the internal reflux at tray 26 and the flow rate of the side draw product stream flowing through conduit means 51. Signal 129 is multiplied by signal 246 to establish signal 248, which is representative of the flow rate of the internal reflux at tray 26 required to maintain the desired ratio between the flow rate of the internal reflux at tray 26 and the flow rate of the side draw product stream flowing through conduit means 51. Signal 248 is provided from the multiplying block 244 as an input to the multiplying block 243. Signal 242 is multiplied by signal 248 to establish signal 249, which is representative of $RI_{26}$ (DHINT). Signal 249 is provided from the multiplying block 243 to the minuend and input of the summing block 214.

As has been previously stated, signal 116 is provided as an input to the calculate enthalpy block 251. Signal 252, which is representative of the enthalpy of the heavy naphtha liquid at tray 26, is provided from the calculate enthalpy block 251 to the minuend input of the summing block 254. Also, as has been previously stated, signal 122 is provided as an input to the calculate enthalpy block 255. Signal 257, which is representative of the enthalphy of the heavy naphtha vapor at tray 27 ($HHNV_{27}$) is provided to the subtrahend input of the summing block 254. Signal 257 is subtracted from signal 252 to establish signal 258, which is representative of DHHVNA. Signal 258 is provided from the summing block 254 as an input to the multiplying block 245. Signal 258 is multiplied by signal 129 to establish signal 261, which is representative of $F_{51}$ (DHHVNA). Signal 261 is provided from the multiplying block 245 to the fourth subtrahend input of the summing block 214.

Signals 212, 221, 237 and 261 are subtracted from signal 249 in the summing block 214 to establish signal 262, which is representative of the numerator of the right-hand side of equation (VIII). Signal 262 is provided from the summing block 214 to the numerator input of the dividing block 231. Signal 262 is divided by signal 230 to establish signal 131, which is representative of the flow rate of the center reflux stream flowing through conduit means 34 required to maintain the desired ratio between the flow rate of the internal reflux at tray 26 and the flow rate of the side draw product stream flowing through conduit means 51. Signal 131 is provided as an output from computer means 100 and is utilized as has been previously described.

The invention has been described in terms of a preferred embodiment as illustrated in FIGS. 1 and 2. Specific components used in the practice of the invention as illustrated in FIG. 1 such as flow sensors 72, 82, 92, 102, and 125; flow transducers 71, 81, 91, 101 and 124; temperature transducers 77, 87, 97, 112, 107, and 118; flow controller 135; and motor operated control valve 139 are each well known, commercially available control components such as are described at length in Perry's Chemical Engineers Handbook, Fourth Edition, Chapter 22, McGraw-Hill.

For reasons of brevity, conventional auxiliary fractionation equipment such as pumps, heat exchangers, additional measurement-control devices, etc., have not been included in the above description as they play no part in the explanation of the invention.

While the invention has been described in terms of the presently preferred embodiment, reasonable variations and modifications are possible by those skilled in the art within the scope of the described invention and the appended claims. Variations such as applying the present invention to a plurality of pumparound return streams are within the scope of the invention.

That which is claimed is:

1. Apparatus comprising:
 a fractional distillation column means;
 means for supplying a feed stream to said fractional distillation column means;
 means for supplying heat to said fractional distillation column means;
 means for withdrawing a side draw stream from a first intermediate portion of said fractional distillation column means;
 means for recycling a portion of said side draw stream to a second intermediate portion of said fractional distillation column means located above said first intermediate portion of said fractional distillation column means as an intermediate external reflux for said fractional distillation column means;
 means for withdrawing a portion of said side draw stream as a side draw product stream from said fractional distillation column means;

means for establishing a first signal representative of the flow rate of said intermediate external reflux required to maintain a desired ratio between the flow rate of the internal reflux at said first intermediate portion of said fractional distillation column means and the flow rate of said side draw product stream;

means for establishing a second signal representative of the actual flow rate of said intermediate external reflux;

means for enabling said means for establishing a second signal to sense the actual flow rate of said intermediate external reflux in said means for recycling;

means for comparing said first signal and said second signal and for establishing a third signal responsive to the difference between said first signal and said second signal; and means for manipulating the flow rate of said intermediate external reflux in response to said third signal.

2. Apparatus in accordance with claim 1 wherein said means for recycling at least a portion of said side draw stream to said second intermediate portion of said fractional distillation column means as said intermediate external reflux for said fractional distillatin column means comprises:

cooling means;

means for passing the portion of said side draw stream being recycled to said fractional distillation column means from said means for withdrawing a side draw stream through said cooling means to said second intermediate portion of said fractional distillation column means.

3. Apparatus in accordance with claim 2 wherein said means for withdrawing a portion of said side draw stream as a side draw product stream from said fractional distillation column means comprises:

separator means;

means for supplying the portion of said side draw stream which is not recycled to said fractional distillation column means to said separator means;

means for supplying heat to said separator means; and means for withdrawing the liquid from said separator means as said side draw product stream.

4. Apparatus in accordance with claim 3 additionally comprising means for withdrawing a vapor stream from said separator means and for returning the thus withdrawn vapor stream as an intermediate vapor reflux to a third intermediate portion of said fractional distillation column means above said second intermediate portion of said fractional distillation column means.

5. Apparatus in accordance with claim 4 additionally comprising:

second cooling means;

an overhead accumulator means;

means for withdrawing an overhead vapor stream from an upper portion of said fractional distillation column means and for passing said overhead vapor stream through said second cooling means to said overhead accumulator means;

means for withdrawing a liquid stream from said overhead accumulator means and for returning a portion of the thus withdrawn liquid stream to an upper portion of said fractional distillation column means as an upper external reflux.

6. Apparatus in accordance with claim 5 wherein said means for establishing said first signal comprises:

means for establishing a fourth signal representative of the Btu's per hour which must be provided to said fractional distillation column means by said intermediate external reflux to maintain said desired ratio;

means for establishing a fifth signal representative of the heat supplied per unit volume of said intermediate external reflux; and means for dividing said fourth signal by said fifth signal to establish said first signal.

7. Apparatus in accordance with claim 6 wherein said means for establishing said fourth signal comprises:

means for establishing a sixth signal representative of the enthalpy of the vapor at a fourth intermediate portion of said fractional distillation column means which is below said first intermediate portion of said fractional distillation column means ($HV_{27}$)

means for establishing a seventh signal representative of the enthalpy of said overhead vapor ($HV_{15}$);

means for subtracting said sixth signal from said seventh signal to establish an eighth signal representative of $HV_{15} - HV_{27}$;

means for establishing a ninth signal representative of the flow rate of said overhead vapor ($F_{15}$);

means for multiplying said eighth signal by said ninth signal to establish a tenth signal representative of $F_{15}(HV_{15} - HV_{27})$;

means for establishing an eleventh signal representative of the enthalpy of said upper external reflux ($HL_{24}$);

means for subtracting said eleventh signal from said seventh signal to establish a twelfth signal representative of $HV_{15} - HL_{24}$;

means for establishing a thirteenth signal representative of the flow rate of said upper external reflux ($F_{24}$);

means for multiplying said twelfth signal by said thirteenth signal to establish a fourteenth signal representative of $F_{24}(HV_{15} - HL_{24})$;

means for establishing a fifteenth signal representative of the enthalpy of said side draw stream ($HL_{28}$);

means for establishing a sixteenth signal representative of the enthalpy of said intermediate vapor reflux ($HV_{53}$);

means for subtracting said sixteenth signal from said fifteenth signal to establish a seventeenth signal representative of $HL_{28} - HV_{53}$;

means for establishing an eighteenth signal representative of the flow rate of said intermediate vapor reflux ($F_{53}$);

means for multiplying said seventeenth signal by said eighteenth signal to establish a nineteenth signal representative of $F_{53}(HL_{28} - HV_{53})$;

means for establishing a twentieth signal representative of the enthalpy of the heavy naphtha vapor at said fourth intermediate portion of said fractional distillation column means ($HHNV_{27}$);

means for subtracting said fifteenth signal from said twentieth signal to establish a twenty-first signal representative of $HHNV_{27} - HL_{28}$;

means for establishing a twenty-second signal representative of the actual flow rate of said side draw product stream ($F_{51}$);

means for establishing a twenty-third signal representative of the flow rate of said internal reflux at said first intermediate portion of said fractional distillation column means ($RI_{26}$) required to maintain said desired ratio in response to said twenty-second signal;

means for multiplying said twenty-first signal by said twenty-third signal to establish a twenty-fourth signal representative of $RI_{26} (HHNV_{27}-HL_{28})$;

means for establishing a twenty-fifth signal representative of the enthalpy of the heavy naphtha liquid at said first intermediate portion of said fractional distillation column means ($HHNL_{26}$);

means for subtracting said twentieth signal from said twenty-fifth signal to establish a twenty-sixth signal representative of $HHNL_{26}-HHNV_{27}$; and means for multiplying said twenty-sixth signal by said said twenty-second signal to establish a twenty-seventh signal representative of $F_{51}(HHNL_{26}-HHNV_{27})$; and means for subtracting said tenth signal, said fourteenth signal, said nineteenth signal and said twenty-seventh signal from said twenty-fourth signal to thereby establish said fourth signal.

8. Apparatus in accordance with claim 7 wherein said means for establishing said fifth signal comprises:

means for establishing a twenty-eighth signal representative of the enthalpy of said intermediate external reflux; and means for subtracting said twenty-eighth signal from said fifteenth signal to thereby establish said fifth signal.

* * * * *